United States Patent Office 3,425,899
Patented Feb. 4, 1969

3,425,899
METHOD AND APPARATUS FOR BREAKING FOAM ON FOAMING LIQUIDS AND USE THEREOF IN OXIDATION SYSTEM FOR REGENERATION OF BLACK LIQUOR IN SULFATE PULP PROCESS
Goran A. Nilsson, P.O. Box 2190, Sandarne, Sweden
Filed Nov. 25, 1964, Ser. No. 413,699
U.S. Cl. 162—30                                    5 Claims
Int. Cl. D21c 11/02; B01d 19/02

ABSTRACT OF THE DISCLOSURE

Foam on foaming liquids, such as black liquor, is broken by treating the same in a chamber with high pressure air to convert the same into a foamed mass of bubbles. These bubbles are caused to be separated into their component liquid and vapor phases by acting upon them with centrifugal force which is sufficiently great to crush the bubbles when they contact the liquid film of previously broken bubbles flowing down along the wall of the centrifuging drum.

---

This invention relates to a method and apparatus for breaking or collapsing the foam on foaming liquids.

The invention is particularly applicable for the elimination of the foaming problems connected with the oxidation of the residual black liquor in the sulfate pulp process, although not necessarily limited thereto.

The subject matter relates to a problem that has for many years been troublesome in the paper making industry, in which pulp is produced by digestion or so-called "cooking" of wood chips with chemicals, such as sodium sulfate, in aqueous solution or alkali disulfite. By such treatment of wood chips, the lignin and other non-cellulosic content of the wood is separated from its cellulose content. The liquor resulting from such treatment of wood chips contains varying amounts of sodium sulfide, mercaptans and other organic sulfides and disulfides. These sulphur compounds, as well known, are highly malodorous in commercial practice of the so-called kraft process, it is customary to evaporate the aqueous content of black liquor and to calcine the dry solids in order to regenerate as much sodium sulfide as possible for reuse in the cooking of additional quantities of the wood chips, while at the same time to recover the heat value of organic matter present in the solids.

The evaporation of the black liquor and the calcination of the dry solids result in the evolution of substantial quantities of hydrogen sulfide, mercaptans and other organic sulphur compounds. The pollution of the surrounding atmosphere by these highly objectionable malodorous compounds has always presented a very serious problem.

Accordingly, for a number of years it has been the practice to subject black liquor to oxidation prior to the evaporation of its aqueous content and calcination of the dry solids. This preliminary oxidation step seeks to oxidize the sulphur compounds contained in the black liquor in order to convert them into compounds of lower volatility so as thereby to reduce the objectionable pollution of the surrounding atmosphere during the subsequent evaporation and calcination steps, while at the same time to decrease sulphur losses.

The oxidation is generally effected by diffusing compressed air into the liquor while feeding the liquor and the compressed air into one end of the reaction zone in which a constant pressure of about 10 to 100 pounds per square inch at a temperature of about 70° to 95° C. is maintained. The thus oxidized liquor containing the non-malodorous oxidation product of the malodorous mercaptans and organic sulfides and disulfides mixed with air is discharged from the reaction zone upon completion of the oxidation process.

However, among the problems connected with the oxidation of black liquor is the foaming problem. This problem is caused by soluble rosin soap washed out from the pulp which forms a foam on the black liquor. Therefore, in most instances a special foam tank must be incorporated in the system to remove the foam before the liquor goes to the evaporator, in which a temperature of about 90° C. is maintained. In the evaporators the liquor is thickened to a point where it contains about 50% solids and turns into a black sticky mixture and from the evaporators this sticky mixture is pumped and subsequently sprayed into a recovery furnace. The smelt or molten black ash from the furnace is then run into a dissolving tank where the smelt is dissolved in water to form green liquor. This green liquor is then causticized with lime to produce white liquor for the next cooking operation.

If the rosin soaps are allowed to be carried along with the oxidized black liquor to the evaporators, these soaps will cause foaming in the evaporator with consequent serious loss in efficiency. Furthermore, the rosin soaps carbonize rapidly in the hot evaporators and become encrusted on the walls of the evaporator tubes thus adding technical and economical problems.

Furthermore, when following the teachings of the conventional oxidation process the oxidized liquor must be thickened in order to counteract to some extent the foaming of the liquor in the evaporators. This thickening is usually done by mixing the in-going black liquor with already concentrated or thick liquor pumped from the evaporators.

Another very important factor in the economy of the soda sulfate process is the recovery of the rosin soaps and other sodium salts.

It is, therefore, the object of the invention to eliminate the foregoing problems and provide a method and apparatus which will effectively and efficiently eliminate the foaming and remove the rosin soaps during the oxidation process of the black liquor before it goes to the evaporator.

It is a further object to provide a method and apparatus permitting use of relatively thin liquor going to the evaporator, such as of the order of 10°–12° on the Baume Scale thus eliminating the necessity of mixing the residual black liquor normally having a thickness of 5°–9° on the Baume Scale with thickened liquor from the evaporators with a consequent saving in equipment and installation cost.

Another object is to provide a combined oxidizing apparatus and foam eliminator.

Further objects and advantages inherent in the invention will become apparent from the following specification taken in conjunction with the accompanying drawings which show by way of example how the invention may be applied.

Figure 1:
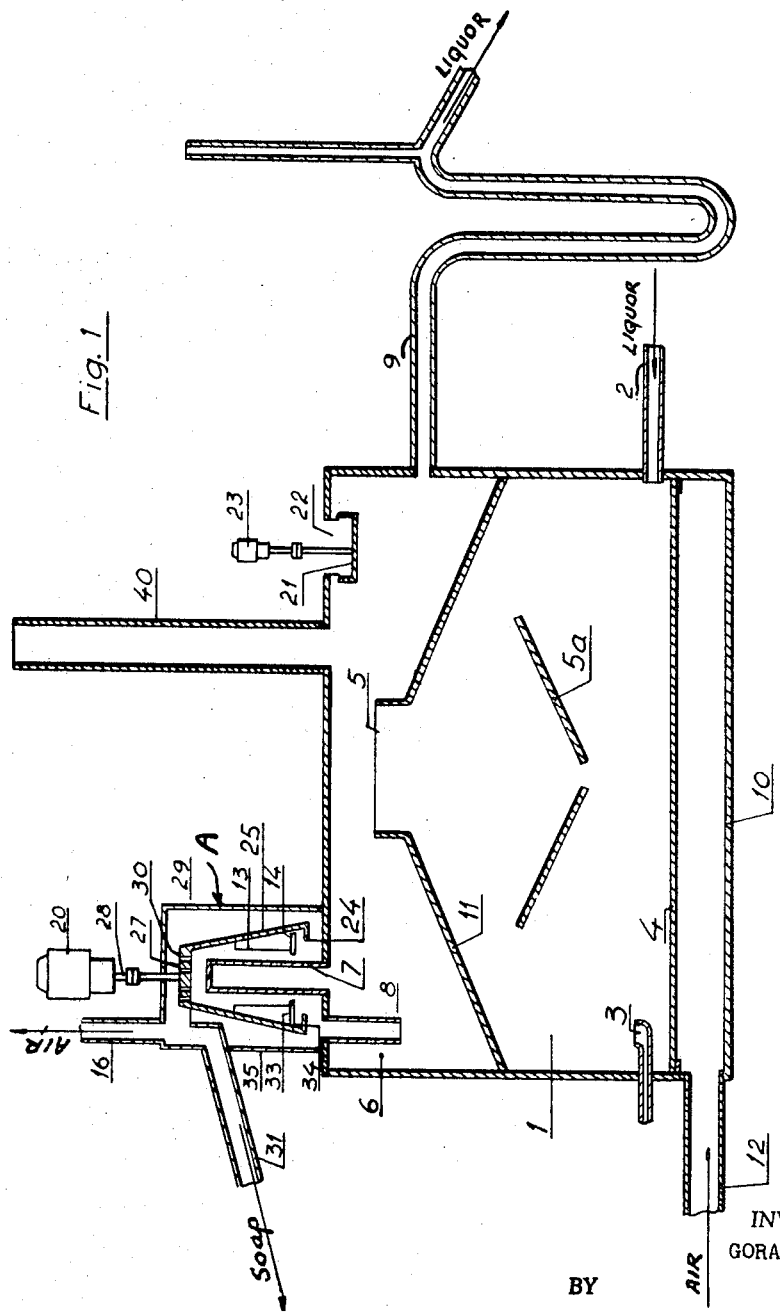
FIG. 1 is a cross-sectional view of the apparatus according to the invention applied to an oxidation system for the residual black liquor in the sulfate pulp process.
Figure 2:
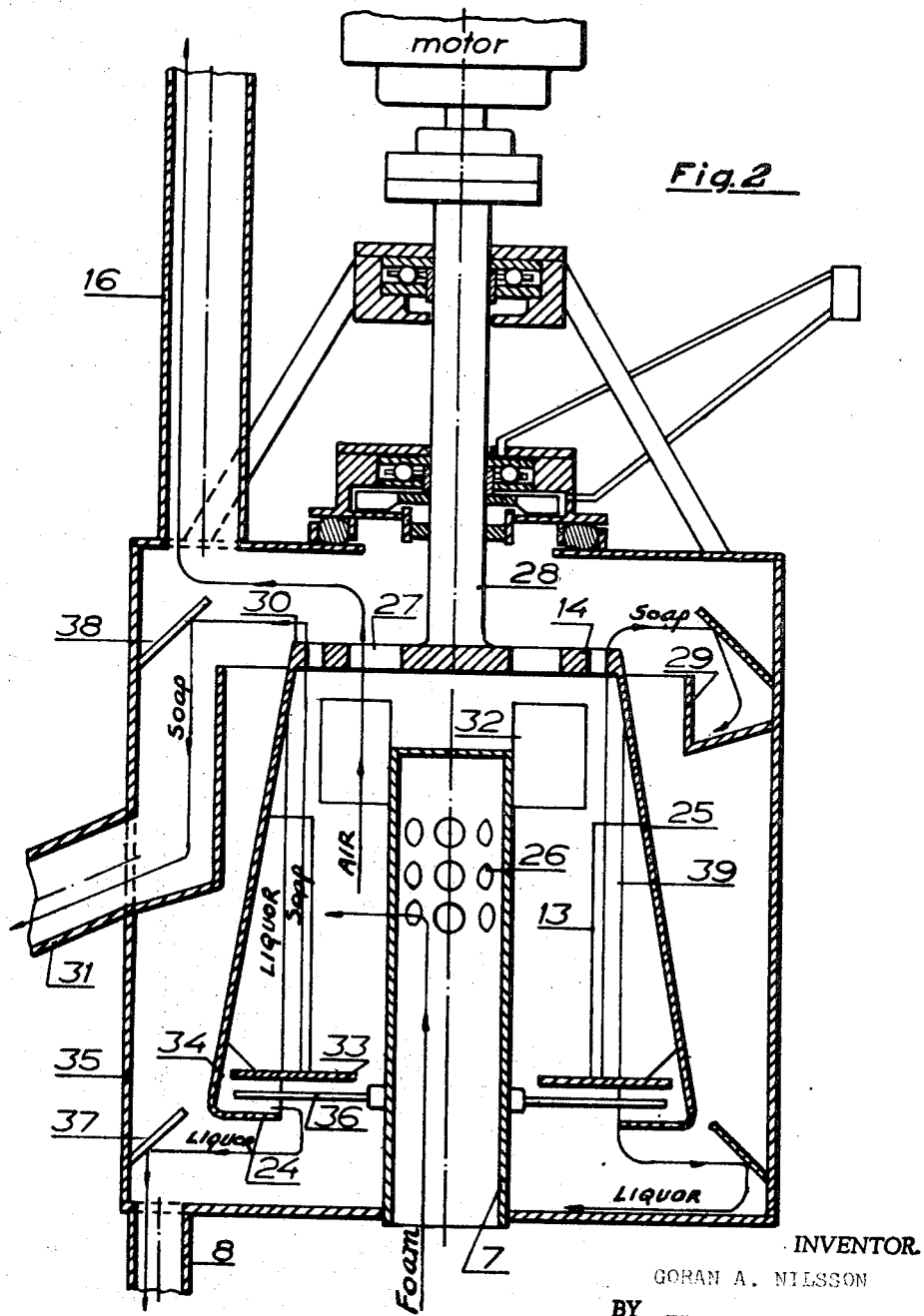
FIG. 2 is a partial cross-sectional view of the apparatus shown in FIG. 1 drawn to an enlarged scale.

Referring to FIG. 1, the foaming chamber 1 receives the residual black liquor from the supply pipe 2. The oxidation of the black liquor takes place principally in the foaming chamber 1 by contact with air which is supplied by a forced draft fan or the like, not shown, through pipe 12, and which is diffused into the foaming chamber 1 through the perforated plate 4 which forms the partition between high pressure air chamber 10 and the foaming chamber 1.

An overflow valve 3 is provided in the foaming chamber to maintain a constant liquor level.

The foaming chamber 1 is provided with a funnel shaped cover 11 having a restricted outlet opening 5. The high pressure air diffused into the chamber will rapidly convert the liquor into a foamed mass of bubbles in which the liquor is suspended in the form of minute droplets, and which mass will rapidly fill substantially the entire foaming chamber and well through the restricted opening 5 into the air escape chamber 6 under the force of the high pressure air. The high pressure air escapes through the stack 40 while the foamed mass is urged into the foam breaker generally indicated at A through the holes 26 in the pipe 7. The foam breaker comprises a frustoconical drum or housing 14 which is rotated by the motor 20 by means of the shaft 28. The foam breaker thus acts in the manner of a centrigugal separator. The blades 13 which are mounted on the interior wall 25 of the drum will rotate or spin the foam mass as the drum is rotated and the centrifugal force will fling the bubbles against the wall 25 of the drum. The bubbles will burst upon their impingement against the wall and be broken up into their components of air and liquid. The liberated air escapes to the atmosphere through perforations 27 and 30 and exits to the atmosphere through the stack 16. The defoamed liquor collects in the interior of the drum above the arms 36 and trickles out over the rim 24 through the gap 34 and is flung against the baffle 37 which is mounted on the lower part of the wall 35 of the foam breaker housing. The baffle 37 deflects the liquor back into the air escape chamber 6 where it becomes mixed with liquor resulting from the collapse of a small portion of the foam mass during its passage to the foam breaker, and is pumped out through the pipe 9 to a supply tank or directly to the evaporators.

By reason of the narrow outflow gap 34 the freed liquor will be retained for a certain period of time in the interior of the drum and during this period of retention, the rosin soaps will be separated from the liquor by reason of their lower specific weight and will tend to flow towards the axis of rotation. An annular separator plate 33 carried by the blades 13 prevents the soap components from running out through the gap 34. After the liquor has reached a sufficiently high level in the drum, the soap components will pass through the holes 30 and upon their exit are flung against the baffle 38 on the wall of the foam breaker housing and is collected in the trough 29. From the trough 29 the soap components are pumped to a tank (not shown) through pipe 31.

For several reasons it may not be practical to operate the oxidation system with only the volume of air which in theory corresponds to the requirement. It is, therefore, advantageous not to allow both foam and excess air to pass through the foam breaker. Instead the excess air may escape through, for example, the centrifuging device 22 which is rotated by a motor 23. The housing may consist of a fine mesh, whereas the bottom consists of an imperforate plate 21. As the plate 21 is rotated, the liquor is retained whereas the air escapes through the mesh.

In order to prevent the foam from being entrapped beneath the conical cover 11, plates 5a may be mounted in the foaming chamber.

The overflow valve 3 in the foaming chamber is preferably so regulated that the liquor on the plate 4 is maintained at a level of about 3 cm. to 12 cm.

The oxidation process naturally depends upon the temperature and the most suitable conditions are attained if the liquor is introduced into the foaming chamber at a temperature of about 50°–95° C.

Important advantages are derived from the fact that the soapy components are separated from the black liquor. An evaporatory system operated in conjunction with an oxidation system is shown in alternative 1 in FIG. 3 of the drawing. The residual liquor which has a solid substance content corresponding to about 5°–9° on the Baumé Scale must be concentrated or thickened in order to go through the evaporators without any substantial foaming problems. For this purpose a portion of the thick mixture which has already passed through the evaporator is pumped back to a mixing tank where it is mixed with residual liquor. Soapy components may be removed from the top of the mixing tank, but because of variations in the amount of liquor and the time of retention in the tank, a substantial amount of soap will be carried along with the liquor. This soap which is picked up periodically will cause the liquor to foam more rapidly than otherwise and consequently the liquor will start to foam in the evaporator and such foaming in the evaporator naturally will reduce considerably the capacity of the system. In order to reduce the risk of such foaming it has been found necessary to keep the in-going liquor thick, such as up to 16° on the Baumé Scale at 90° C. In order to attain such thickness a large portion of the thick liquor must be circulated through the system with a consequent loss of efficiency. Furthermore, as hereinbefore pointed out, the soapy components carbonize rapidly in the evaporators and form the major portion of the encrustation problems.

By using the oxidation system according to the present invention in which the soap components are separated from the liquor, the risk of the soap components being carried along the evaporators is entirely eliminated. By reason thereof thinner or weak liquor can be used in the evaporation step. Since a lesser amount of thick liquor is required, the efficiency of the system will be increased, and the encrustation problems will be reduced to a very high degree.

Figure 3:
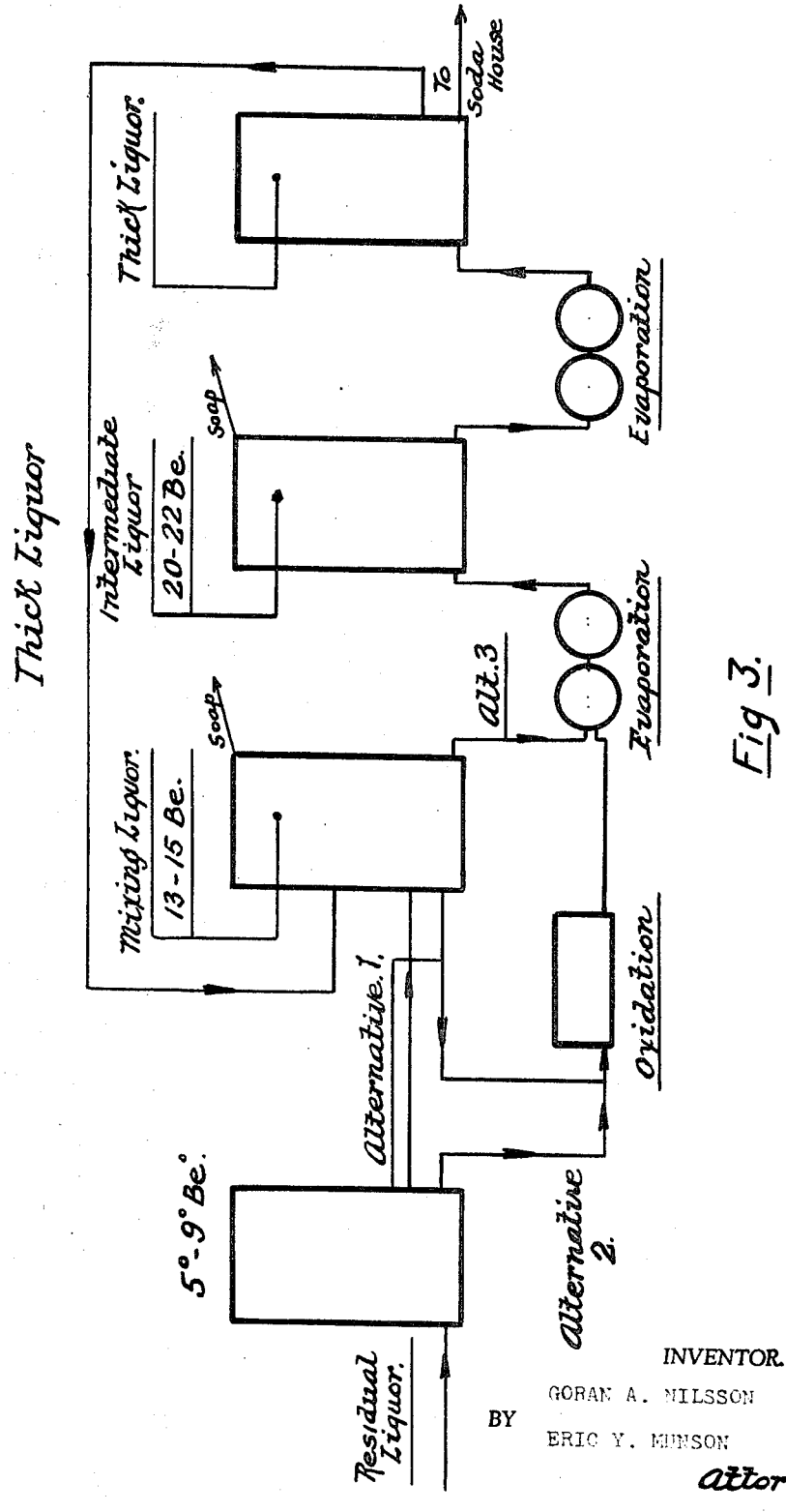
FIG. 3 is a schematic view of a recovery system for the residual black liquor illustrating several advantages resulting from the invention.

In mills where liquor of a certain type is used, the foaming problem will become so insignificant that the mixing tank shown in FIG. 3 can be dispensed with entirely and the evaporator system can be operated as shown in alternative 2 in FIG. 3.

Among the many advantages resulting from the invention is the much greater recovery rate of the soap components than has been possible with heretofore known methods. According to the known methods one has always separated as great an amount of the soap components as possible before the oxidation step. According to the invention substantial amounts of soap components are recovered in the foam breaker even if soap components have earlier been removed in the sedimentation treatment prior to the oxidation step.

It appears namely that the capacity of the black liquor to dissolve the soaps is reduced by the oxidation process. Heretofore no one has understood that possibility of recovering the soap precipitated in the oxidation process, as the general practice was to let the liquor from the oxidation step go directly to the evaporators, with consequent creation of encrustation and heat exchange problems.

It should be understood that the invention has been described and shown by way of example only, and it may lend itself to a variety of expressions within the scope of the appended claims.

What I claim is:

1. The method of breaking the foam on foaming liquids, which comprises treating the liquid with high pressure air to convert said liquid into a foamed mass of bubbles in which said liquid is suspended in the form of minute droplets, forcing said foamed mass into a space from which high pressure air is permitted to escape, passing said foamed mass from said space into the interior of a rotating frusto-conical member, said rotating member exerting a centrifugal force effective to cause the foamed mass to spin and said bubbles to be pressed against the interior surface of said member with sufficient force to burst said bubbles into their air and liquid components, collecting the defoamed liquid in the interior of said member, and removing the same therefrom, and permitting liberated air to escape to the atmosphere.

2. The method of breaking the foam and removing the soap components from liquids containing soap, which comprises treating said liquid with high pressure air to convert said liquid into a foamed mass of bubbles in which said liquid is suspended in the form of minute droplets, forcing said foamed mass into a space from which high pressure air is permitted to escape, passing said foamed mass from said space into the interior of a rotating frusto-conical member, said rotating member exerting a centrifugal force effective to cause the foamed mass to spin and said bubbles to be pressed against the interior surface of said member with sufficient force to burst said bubbles into their air and liquid components, said liquid components consisting of soap and defoamed liquid, permitting the liberated air to escape to the atmosphere, causing said soap components to separate from said deformed liquid by virtue of their lower specific weight, causing the defoamed soap-free liquid to flow through one path for collection thereof, while causing said soap components to flow for collection through a second path separate from said first-named path.

3. In a system of regenerating the black liquor in the sulfate pulp process in which the black liquor is subjected to an oxidation treatment by contact with air before any substantial evaporation thereof, the method of breaking the foam on said liquor and separating the soap components therefrom, which comprises bringing high pressure air into contact with said liquor to convert the liquor into a foamed mass of bubbles in which said liquor is suspended in the form of minute droplets, forcing said foamed mass into a space from which high pressure air is permitted to escape, passing said foamed mass from said space into the interior of a rotating frusto-conical member, said rotating member exerting a centrifugal force effective to cause the foamed mass to spin and said bubbles to be pressed against the interior surface of said member with sufficient force to break the bubbles, collecting the defoamed liquor in the interior of said member, while permitting liberated air to escape, separating the soap components from the defoamed liquor, and separately removing the defoamed liquor and the soap components.

4. Apparatus of the character described comprising a chamber having an inlet for liquid, means for admitting air under superatmospheric pressure into said chamber, whereby to cause said liquid to be formed into a foamed mass of bubbles, an air escape chamber adjoining said first-named chamber, a restricted opening between said first-named chamber and said air escape chamber for admitting the foamed liquid into said air escape chamber, a foam breaking device communicating with said air escape chamber, said foam breaking device comprising a rotatable frusto-conical member, means for rotating said member to exert a centrifugal force effective to cause the foamed mass to spin and said bubbles to be pressed against the interior surface of said member with sufficient force to burst said bubbles into their air and liquid components, means for allowing liberated air to escape from said member, means for providing a restrained flow of defoamed liquid from said member, and means for removing the defoamed liquid from said member.

5. An oxidation system of the character described for the regeneration of the black liquor in the sulfate pulp process, comprising an oxidation chamber having means for admitting black liquor thereto, means for admitting air under pressure into said oxidation chamber, an air escape chamber adjoining said oxidation chamber, a restricted opening between said oxidation chamber and said escape chamber, means in said air escape chamber for permitting the high pressure air to escape while retaining the foamed liquor therein, a foam breaking device communicating with said air escape chamber, said foam breaking device comprising a rotatable frusto-conical member and means for rotating the same to create a centrifugal force sufficient to cause the foamed mass to spin and said bubbles to be pressed against the interior of said member to burst said bubbles into their air and liquid components, means for permitting liberated air to escape from said member, means mounted in the interior of said member to provide a restrained flow of defoamed liquor from said member to enable the soap components to separate from the black liquor by their lower specific weight, means for removing the defoamed soap-free liquor from said member, and separate means for removing the separated soap components therefrom.

References Cited

UNITED STATES PATENTS

| | | | |
|---|---|---|---|
| 1,506,732 | 9/1924 | Benjamin | 159—47 |
| 2,366,513 | 1/1945 | Gates | 252—361 X |
| 2,446,717 | 8/1948 | Naucler | 252—361 |
| 2,999,044 | 9/1961 | Collins | 162—30 |
| 3,183,145 | 5/1965 | Collins | 159—47 X |

RICHARD D. LOVERING, *Primary Examiner.*

U.S. Cl. X.R.

159—47; 252—321, 361